Patented Apr. 10, 1945

2,373,094

UNITED STATES PATENT OFFICE 2,373,094

MINERAL OIL COMPOSITION

Henry G. Berger, Thomas T. Noland, and Everett W. Fuller, Woodbury, N. J., assignors to Socony-Vacuum Oil Company, Incorporated, a corporation of New York No Drawing. Application March 18, 1943, Serial No. 479,640

12 Claims. (Cl. 252—48)

This invention has to do with the stabilization of viscous mineral oil fractions against the deleterious effects of oxidation or deterioration with use by the addition thereto of oxidation inhibitors. More specifically, the present invention is directed to the improvement of viscous mineral oil fractions by the use of a combination of such inhibitors, namely, a primary oxidation inhibitor and a secondary inhibitor, which when admixed with a viscous mineral oil in minor proportions will prevent or delay undesirable changes taking place in the oil.

As is well known to those familiar with the art, substantially all of the numerous fractions obtained from mineral oil and refined for their numerous uses are susceptible to oxidation. The susceptibility of an oil fraction to oxidation and the manner in which oxidation manifests itself within the oil varies with the type and degree of refinement to which the oil has been subjected and with the conditions under which it is used or tested. That is, the products formed in an oil fraction as a result of oxidation and the degree to which they are formed depends upon the extent to which the various unstable constituents or constituents which may act as oxidation catalysts have been removed by refining operations and also upon the conditions of use.

The present invention is predicated upon the discovery that the oxidation characteristics of viscous mineral oil fractions are greatly improved by the incorporation therein of minor proportions of each of two inhibitors which are designated herein as primary oxidation inhibitors and secondary inhibitors.

The primary oxidation inhibitors contemplated herein are phosphorus- and sulfur-containing compounds or reaction products obtained by the reaction of a phosphorus sulfide and a hydrocarbon fraction known in the art as a thermal recycle stock. These inhibitors may be prepared as illustrated hereinafter from any of the phosphorus sulfides, such as $P_3S_6$ (or $PS_2$), $P_4S_6$ (or $P_2S_3$), $P_4S_3$, $P_2S_5$, $P_4S_7$, $P_4S_{10}$, etc., and from any of the recycle stocks obtained from a petroleum cracking operation. Preferred of such hydrocarbon stocks are liquid phase and vapor phase recycle stocks obtained in the thermal cracking of petroleum for the obtainment of gasoline. Also contemplated as coming within the preferred class of recycle stocks are those obtained in the catalytic cracking of petroleum by means of synthetic catalysts, typical of which are the synthetic alumina-silica type catalysts. In general, the preferred recycle stocks described above are identified by boiling ranges from about 200° C. to about 400° C., specific gravities from about 0.880 to about 0.924, and aniline numbers from about 50 to about 130. A particularly preferred oxidation inhibitor of this group is one obtained by reaction of phosphorus pentasulfide ($P_2S_5$) and a preferred recycle stock.

In the preparation of the primary oxidation inhibitors temperature is the most important of the several reaction conditions involved. The reaction between a phosphorus sulfide and a recycle stock takes place at temperatures between about 125° C. and 200° C., and temperatures within this range are preferred herein. Temperatures above 200° C. are less desirable inasmuch as excessive amounts of insoluble sludge are formed in the reaction. The recycle stock may be reacted with from about 5% to about 15% by weight of a phosphorus sulfide. The reaction time may vary from one to two to eight or more hours depending upon the temperature, recycle stock, amount of phosphorus sulfide, etc.

The chemical structures of the primary oxidation inhibitors are not definitely known, and these inhibitors are probably mixtures of various materials. During the reaction of a phosphorus sulfide and a recycle stock, there is only a slight evolution of hydrogen sulfide and the final product contains phosphous and sulfur in approximately the same mol ratio as does the phosphorus sulfide used. It would appear, therefore, that the reaction is to a large degree one of addition and to a lesser degree one of substitution. Accordingly, the primary oxidation inhibitors prepared under the conditions recited above are described as reaction products. To describe these inhibitors in this manner appears to be more accurate than to describe the same as definite compounds.

The aforesaid primary oxidation inhibitors effect improvement of several of the oxidation characteristics of viscous mineral oil fractions when used therein in small amounts, improvement during use being affected, for example, by the prevention of corrosion of hard metal bearings, the inhibition of acid formation, the inhibition of gummy deposits in engines, increase in viscosity, etc. Such oil fractions containing only primary oxidation inhibitors are, however, undesirable from the standpoint of solubility stability, or resistance to haze formation. On standing for several days or when heated and then left to stand, an oil composition comprised of a viscous mineral oil fraction and a primary oxidation inhibitor tends to become cloudy. This shortcoming has now been overcome by incorporating a small amount of a secondary inhibitor in such an oil composition.

The secondary inhibitors of this invention which are capable of retarding or preventing the aforesaid haze problem are phenols substituted with one or more long-chain alkyl groups, and alcohols having a long-chain alkyl group. Particularly preferred of such materials are ocenol (practical oleyl alcohol), stenol (practical stearyl alcohol) and "wax-phenols." The preferred materials of this class which are designated as "wax-phenols" are those obtained by reaction of a phenol and a chlorinated petroleum wax having at least about twenty carbon atoms, such as described in U. S. Patents 2,191,498-9 issued to Orland M. Reiff. A wax-substituted phenol prepared as indicated in said patents, in which a quantity of chlorwax containing three atomic proportions of chlorine (twenty per cent chlorine in the chlorwax) is reacted with one mol of phenol, may, for brevity herein, be designated as "wax-phenol (3–20)." Parenthetical expressions of this type (A—B) will be used hereinafter in connection with the alkylated phenols to designate (A) the number of atomic proportions of chlorine in a chlor-aliphatic material (chlorowax) reacted with one mol of a phenol in a Friedel-Crafts reaction, and (B) the chlorine content of the chlor-aliphatic material (chlorwax). In this example, therefore, A=3 and B=20.

It will be apparent from the foregoing that the term "wax" used in connection with the wax-phenols is an alkyl group having at least twenty carbon atoms and is typified by the hydrocarbon constitutent of a chlorinated petroleum fraction known in the art as "chlorinated paraffin wax."

As used herein the term "long-chain alkyl group" will define a carbon chain of at least about eight carbon atoms when used in connection with the long-chain alkyl alcohols and will define a carbon chain of at least about twenty carbon atoms when used in connection with phenols substituted with long-chain alkyl groups.

The particularly preferred combinations of primary and secondary inhibitors in viscous mineral oil fractions which are contemplated herein are those in which the primary inhibitor is a $P_2S_5$-recycle stock reaction product and the secondary inhibitor is either ocenol, stenol, or a wax-phenol To illustrate the primary oxidation inhibitors contemplated herein, a typical inhibitor of this class was prepared as described in Example 1 below.

Example 1

A recycle stock from a thermal liquid phase cracking operation was used, and was identified by the following:

| | |
|---|---|
| Specific gravity | 0.8939 |
| Aniline number | 105.5 |
| Boiling range, °C.: | |
| Initial B. P. | 97 |
| 5% | 204 |
| 10% | 230 |
| 50% | 274 |
| 90% | 327 |
| End point | 366 |
| Recovered  per cent | 98.5 |

One thousand (1000) parts of this recycle stock were heated at 150° C. with 50 parts of $P_2S_5$ for eight hours. The reaction mixture was then cooled to 100° C., 5% by weight of Attapulgus clay was added to the mixture and it was then filtered. The product contained 3.6% sulfur and 1.26% phosphorus, and will be referred to hereinafter as product A.

That oil compositions comprising only a viscous mineral oil fraction and a typical primary oxidation inhibitor have a tendency to develop a haze is illustrated by test results set forth in Table 1 below. These results also reveal that a small amount of a typical secondary inhibitor effectively corrects this undesirable characteristic when added to the oil fraction containing the primary inhibitor. The oil used in these tests was a paraffin base oil having a Saybolt Universal viscosity (S. U. V.) of 45 seconds at 210° F. The test samples were heated at 100° C. for twenty-four hours, and the appearance of the samples noted at the end of such time.

Table 1

| Oil containing | Conc., (per cent) | Appearance |
|---|---|---|
| Product A | 1 | Cloudy. |
| Product A + wax-phenol (3–14) | 1<br>0.1 | Very slightly cloudy. |
| Product A + ocenol | 1<br>0.1 | Clear. |

To further illustrate the effectiveness of the secondary inhibitors in correcting the relative solubility instability of an oil containing primary oxidation inhibitor, tests were made of several samples of oils and a typical primary inhibitor, "product A," and of oils containing both product A" and representative secondary inhibitors. The test samples which contained both "product A" and the secondary inhibitors were prepared by first adding the secondary inhibitors to "product A" and then adding the resulting combination to the oils. All of the test samples were maintained at room temperature (20–25° C.) and the number of days before haze developed in each, was noted. The results of these tests are presented below in Table 2. The oils used in these tests are designated as oil A, a paraffin base oil having a S. U. V. of 45 seconds at 210° F.; oil B, a naphthenic base oil having a S. U. V. of 66 seconds at 210° F.

Table 2

| Oil | Primary inhibitor | Conc., per cent | Secondary inhibitor | Conc., per cent | Appearance |
|---|---|---|---|---|---|
| A | Product A | 1 | | | Haze in 21 days. |
| A | do | 1 | Wax-phenol (3-14) | 0.13 | Haze in 49 days. |
| A | do | 1 | Wax-phenol (3-16) | 0.13 | No haze in 71 days. |
| A | do | 1 | Ocenol | 0.10 | No haze at 176 days. |
| A | do | 2 | | | Haze in 5 days. |
| A | do | 2 | Stenol | 0.10 | No haze at 23 days. |
| A | do | 2 | 2-ethyl hexanol | 0.10 | Haze in 16 days. |
| B | do | 1 | | | Haze in 71 days. |
| B | do | 1 | Wax-phenol (3-14) | 0.065 | No haze at 176 days. |
| B | do | 1 | do | 0.13 | Do. |
| B | do | 1 | Wax-phenol (3-16) | 0.13 | Do. |
| B | do | 1 | Ocenol | 0.10 | Do. |
| B | do | 3 | | | Haze within 33 days. |
| B | do | 3 | Wax-phenol (3-14) | 0.13 | Haze at 47 days. |
| B | do | 3 | Wax-phenol (3-16) | 0.13 | Haze at 69 days. |
| B | do | 3 | Ocenol | 0.10 | No haze at 56 days. |
| B | do | 3 | do | 0.20 | No haze at 176 days. |

The results set forth in Tables 1 and 2 above show that haze formation in oils containing a primary oxidation inhibitor, a recycle stock—phosphorus sulfide reaction product, is appreciably inhibited by adding a small amount of a secondary inhibitor. The amount of secondary inhibitor necessary to effect the desired inhibition will depend upon the concentration of primary inhibitor in the oil, and will also depend upon the type of mineral oil fraction used. As indicated in Table 2 above, haze formation with "Product A" is more pronounced in a paraffinic type oil, such as oil A, than in a more naphthenic oil, such as oil B. Therefore, it is usually, although not always, necessary to use more of the secondary inhibitor with a paraffinic type oil. In general, however, from about 5% to about 25% by weight of the secondary inhibitor based upon the primary inhibitor present, will be sufficient to greatly retard haze formation. The amount of primary oxidation inhibitor which is contemplated for use in the oil compositions of this invention is from about 0.01% to about 2.0%. Accordingly, the amount of secondary inhibitor used will be from about 0.005% to about 0.50%.

As contemplated herein the primary and secondary inhibitors of this invention may be incorporated in a viscous mineral oil fraction in any one of several ways. For example, a secondary inhibitor may be added to an oil fraction containing a primary inhibitor or may be added to the primary inhibitor, and the resulting combination or composition then incorporated in the oil. Also, the secondary inhibitor may be added to the reactants used in the preparation of the primary inhibitor—namely, a phosphorus sulfide and a recycle stock—and in such case will be present during the reaction. It is possible that the secondary inhibitor may react with the phosphorus sulfide and the recycle stock to form a complex reaction product under the conditions of reaction which are illustrated hereinabove. The product obtained in this manner is then added to the oil fraction. Still another procedure contemplated herein is that of adding the secondary inhibitor to the reaction mixture of the phosphorus sulfide and recycle stock before the completion of the reaction; then a small amount of the resulting product is added to an oil fraction. Accordingly, it will be apparent that the mineral oil compositions of this invention are complex in nature for it is possible that the primary oxidation inhibitor and the secondary inhibitor may be present individually in a mineral oil fraction, may also be present therein as a physical combination, or further may be present therein in the form of a single chemical composition. In the same connection, it will also be apparent that a primary oxidation inhibitor and a secondary inhibitor in a mineral oil composition of the type contemplated herein may enter into chemical reaction when the mineral oil composition is used as a lubricant under certain conditions, such for example as a lubricant in an engine operating at relatively high temperatures.

In view of the foregoing, the term "mineral oil composition" as used herein, and as recited in all of the appended claims, is inclusive of all mineral oil fractions containing a primary oxidation inhibitor and a secondary inhibitor and is inclusive of oil compositions obtained or prepared by any of the several procedures hereinabove described. Thus, any of the oil compositions obtained or prepared by any of the foregoing procedures is substantially free of haze normally occurring in an oil composition containing a primary oxidation inhibitor but not containing a secondary inhibitor.

It is to be understood that the examples, procedures and oil compositions described hereinabove are illustrative only and not to be construed as limiting the scope of this invention thereto. For example, all recycle stocks as broadly defined above may be used in place of that shown in Example 1. Similarly, any phosphorus sulfide may be used in place of phosphorus pentasulfide shown in the same example, but the latter sulfide is preferred. Also, the paraffinic and naphthenic oils disclosed above are but representative of all viscous mineral oil fractions which may be used herein. Finally, the secondary inhibitors shown in the foregoing test results are preferred of this class but are only illustrative of the various members of their class, phenols substituted with one or more long-chain alkyl groups and long-chain alcohols.

We claim:

1. An improved mineral oil composition comprising a viscous mineral oil fraction having in admixture therewith a minor proportion of a phosphorus- and sulfur-containing reaction product obtained by reaction of phosphorus pentasulfide and a thermal recycle stock at a temperature between about 125° C. and about 200° C., and a minor proportion of a compound selected from the group of compounds consisting of a phenol substituted with at least one long-chain alkyl group and an alcohol having a long-chain alkyl group.

2. An improved mineral oil composition comprising a viscous mineral oil fraction having in admixture therewith a minor proportion of a phosphorus- and sulfur-containing reaction product obtained by reaction of phosphorus pentasulfide and a thermal recycle stock at a temperature between about 125° C. and about 200°

C., and a minor proportion of a phenol substituted with at least one long-chain alkyl group.

3. An improved mineral oil composition comprising a viscous mineral oil fraction having in admixture therewith a minor proportion of a phosphorus- and sulfur-containing reaction product obtained by reaction of phosphorus pentasulfide and a thermal recycle stock, having a boiling range from about 200° C. to about 370° C., at a temperature between about 125° C. and about 200° C., and a minor proportion of a phenol substituted with at least one long-chain alkyl group.

4. An improved mineral oil composition comprising a viscous mineral oil fraction having in admixture therewith a minor proportion of a phosphorus- and sulfur-containing reaction product obtained by reaction of phosphorus pentasulfide and a thermal recycle stock at a temperature between about 125° C. and about 200° C., and a minor proportion of a phenol substituted with at least one wax group, said wax group being an alkyl group having at least twenty carbon atoms and being derived from paraffin wax.

5. An improved mineral oil composition comprising a viscous mineral oil fraction having in admixture therewith a minor proportion of a phosphorus- and sulfur-containing reaction product obtained by reaction of phosphorus pentasulfide and a thermal recycle stock at a temperature between about 125° C. and about 200° C., and a minor proportion of an alcohol having a long-chain alkyl group of at least eight carbon atoms.

6. An improved mineral oil composition comprising a viscous mineral oil fraction having in admixture therewith a minor proportion of a phosphorus- and sulfur-containing reaction product obtained by reaction of phosphorus pentasulfide and a thermal recycle stock at a temperature between about 125° C. and about 200° C., and a minor proportion of ocenol.

7. An improved mineral oil composition comprising a viscous mineral oil fraction having in admixture therewith a minor proportion of a phosphorus- and sulfur-containing reaction product obtained by reaction of phosphorus pentasulfide and a thermal recycle stock at a temperature between about 125° C. and about 200° C., and a minor proportion of stenol.

8. An improved mineral oil composition comprising a viscous mineral oil fraction having in admixture therewith a minor proportion, from about 0.01 per cent to about 2.0 per cent, of a phosphorus- and sulfur-containing reaction product obtained by reaction of phosphorus pentasulfide and a thermal recycle stock at a temperature between about 125° C. and about 200° C. and a minor proportion, from about 0.005 per cent to about 0.5 per cent, of a compound selected from the group of compounds consisting of a phenol substituted with at least one long-chain alkyl group and an alcohol having a long-chain alkyl group.

9. A mineral oil composition normally susceptible to the formation of haze therein, comprising a viscous mineral oil fraction containing a minor proportion of a phosphorus- and sulfur-containing reaction product obtained by reaction of a phosphorus sulfide and a thermal recycle stock at a temperature between about 125° C. and about 200° C., and having in combination therewith a minor proportion, sufficient to suppress the formation of haze therein, of a compound selected from the group of compounds consisting of a phenol substituted with at least one long-chain alkyl group and an alcohol having a long-chain alkyl group.

10. A mineral oil composition normally susceptible to the formation of haze therein, comprising a viscous mineral oil fraction containing a minor proportion, from about 0.01 per cent to about 2.0 per cent, of a phosphorus- and sulfur-containing reaction product obtained by reaction of a phosphorus sulfide and a thermal recycle stock at a temperature greater than about 125° C. and having in combination therewith a minor proportion, from about 0.005 per cent to about 0.5 per cent, to suppress the formation of haze therein, of a compound selected from the group of compounds consisting of a phenol substituted with at least one long-chain alkyl group and an alcohol having a long-chain alkyl group.

11. A mineral oil composition normally susceptible to the formation of haze therein, comprising a viscous mineral oil fraction containing a minor proportion of a phosphorus- and sulfur-containing reaction product obtained by reaction of a phosphorus sulfide and a thermal recycle stock at a temperature greater than about 125° C. and having in chemical combination therewith a minor proportion, sufficient to suppress the formation of haze therein, of a compound selected from the group of compounds consisting of a phenol substituted with at least one long-chain alkyl group and an alcohol having a long-chain alkyl group.

12. A mineral oil composition normally susceptible to the formation of haze therein, comprising a viscous mineral oil fraction containing a minor proportion, from about 0.01 per cent to about 2.0 per cent, of a phosphorus- and sulfur-containing reaction product obtained by reaction of a phosphorus sulfide and a thermal recycle stock at a temperature greater than about 125° C. and having in chemical combination therewith a minor proportion, from about 0.005 per cent to about 0.5 per cent, to suppress the formation of haze therein, of a compound selected from the group of compounds consisting of a phenol substituted with at least one long-chain alkyl group and an alcohol having a long-chain alkyl group.

HENRY G. BERGER.
THOMAS T. NOLAND.
EVERETT W. FULLER.